Jan. 16, 1940.  L. F. MOTT  2,187,461
COW SUCKING PREVENTER
Filed April 21, 1938
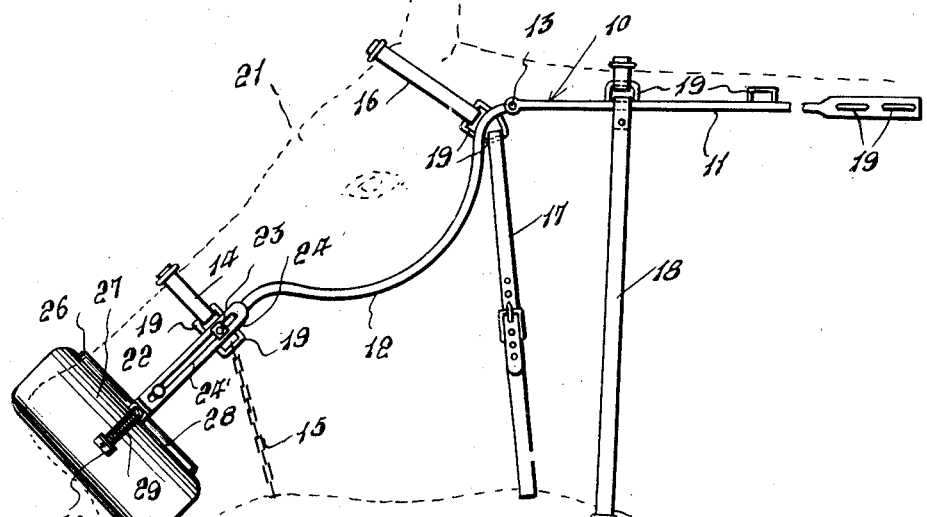
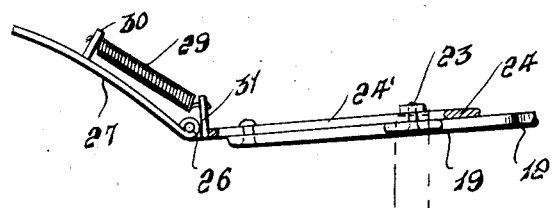
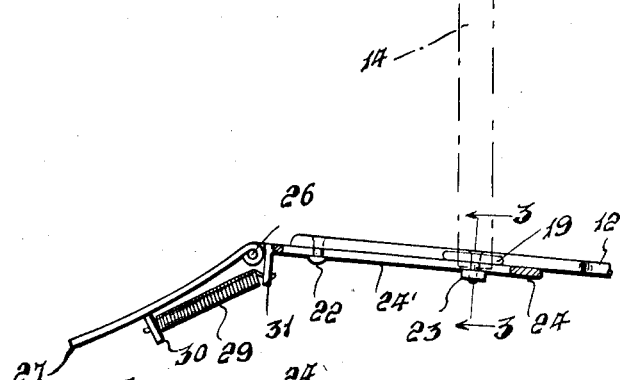
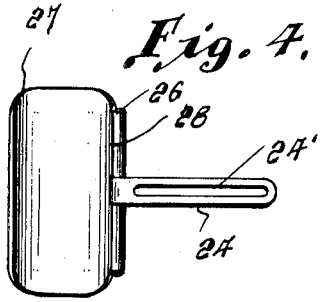
Inventor
Louis F. Mott
Attorney Patented Jan. 16, 1940

2,187,461

UNITED STATES PATENT OFFICE 2,187,461

COW SUCKING PREVENTER

Louis Forrest Mott, Big Spring, Tex.

Application April 21, 1938, Serial No. 203,422

5 Claims. (Cl. 119—131)

This invention relates to an improved attachment for cows or other female animals, of the domestic type, to prevent the animal from sucking or milking itself.

More particularly, it is an object of this invention to provide an improved attachment which may readily be attached to the head of a female animal, and which may be worn without discomfort and without preventing the animal from feeding freely, but which will efficiently function to prevent the animal from sucking or milking itself.

More particularly it is an object of this invention to provide a device of the aforementioned character having members adapted to be disposed on opposite sides of an animal's head and to be connected to the head harness, to support guard plates in position on opposite sides of the animal's mouth in such a manner that the animal may feed freely and will be caused no suffering or irritation from wearing the device, yet which is so arranged that should the animal attempt to milk or suck itself one or the other of the guard plates will be forced against the side of the mouth to discourage and prevent the practice.

Other objects and advantages of the invention will hereinafter become more fully apparent from the following description of the drawing which illustrates a preferred form of the invention, and wherein:

Figure 1 is a side elevational view showing the head of an animal in dotted lines, having the invention applied thereto, Figure 2 is a top plan view of the lower portion of the two members forming the invention showing their normal position when applied to an animal's head.

Figure 3 is a cross sectional view taken on the line 3—3 of Figure 2, and

Figure 4 is an enlarged side elevational view showing one of the guard plates or shields hinged to its sliding section.

Referring more particularly to the drawing wherein like reference characters designate like or corresponding parts throughout the different views, 10 designates generally one of the supporting members adapted to be disposed on one side of the head of an animal. Members 10 comprise the upper and lower sections 11 and 12, respectively, which are hinged at 13. A member 10 is adapted to be positioned on each side of the head of an animal and to be held in position by the nose band 14, curb chain 15, brow strap 16, throatlatch 17 and neck strap or collar 18, all of which are connected to the loops 19.

The head of an animal is shown in dotted lines in Figure 1 at 21 to illustrate the application of the invention. It will be seen from this figure, that the upper parts of the sections 12 are arcuately shaped to curve away from the animal's eyes so as not to interfere with its vision.

Slidably and adjustably connected to the lower ends of the sections 12 by means of the rivets 22 and the nut and bolt fastenings 23, are the slotted members 24 through which rivets 22 and fastenings 23, which are connected to members 12, extend, to connect the members 24 to the lower ends of sections 12. Rivets 22 and fastenings 23 engage the slots 24' in portions 24 to permit lengthwise adjustment of said portions, and the fastenings 23 may be tightened to clamp the portions in adjusted position. Fastenings 23 may be mounted in slots 24' in sections 12 to permit them to move relatively thereto for additional adjustment of the portions 24. Portions 24 have pins or bolts 26 disposed at right angles to their lower ends, and on which the guard plates or shields 27 are hinged as indicated at 28.

The guard plates or shields 27 are mounted to be positioned on opposite sides of the animal's mouth, as best seen in Figure 1, and are held slightly away from the mouth by means of the coil springs 29 connected to ears 30 and 31 on the outer sides of the shields 27 and portions 24, respectively.

From the foregoing it will be obvious, that when the invention is attached to the head of a female animal as heretofore explained, the shields or guards 27 will be disposed on opposite sides of its mouth and out of engagement therewith by means of the springs 29 so that the animal may graze, or feed in a stanchion without being affected thereby. The members 10 are constructed to be readily supported by a conventional head harness in such a manner that they will not irritate or bother the animal. By means of the portions 24 to which the shields 27 are hinged, the latter may be readily lengthened or shortened so that they will not overlie the end of the animal's mouth to prevent normal feeding, while at the same time being in a position where they will effectively prevent the animal from sucking itself. Should the animal attempt to turn its head around into a position to milk itself, one or the other of the shields 27 will be brought into contact with the milk bag and will be pressed inwardly thereby into engagement with the animal's mouth to prevent it from accomplishing its purpose, and will be held in this position until the pressure against the bag is released at which time the spring 29 will draw it outwardly and away from the animal's mouth, thereby preventing the practice.

The relative sizes of the parts may obviously be varied depending upon the animal with which it is to be used, and other variations in the construction and shape of the parts, particularly in the shape of the shields 27, may obviously be made and are contemplated without departing from the spirit of the invention and the right is therefore reserved to make such variations and changes as fall within the scope of the invention as hereinafter defined by the appended claims.

I claim as my invention:

1. In a device of the class described, corresponding supporting members formed of pivotally connected sections and adapted to be connected to the head harness of an animal to be supported thereby at opposite sides of the animal's head, guards pivotally connected to corresponding ends of said members and adapted to be disposed at opposite sides of the animal's mouth, and contractile spring means normally holding said guards out of engagement with the mouth.

2. An anti-milking or sucking device for animals comprising rods formed of pivotally connected sections and adapted to be disposed on opposite sides of an animal's head, said members being provided wtih spaced loops adapted to be connected to the head harness of the animal to retain the members in position, guard members hinged to the lower ends of said members and adapted to be disposed at opposite sides of the animal's mouth, and spring means connected to said guards to urge them away from the mouth, said guards being normally held at an acute angle to the sides of the mouth to permit the animal to feed freely while preventing it from turning its head into a position to milk itself.

3. In an anti-milking and anti-sucking attachment for animals, supporting members adapted to be positioned on opposite sides of an animal's head and to be connected to its head harness to retain the members in position thereon, said members including portions slidably mounted at their lower ends, guards pivotally connected to the free ends of said portions and disposed on opposite sides of the animal's mouth, and contractile spring means normally retaining said guards out of engagement with the mouth to permit the animal to feed.

4. An anti-milking attachment for animals comprising a head harness, side shields, supporting members slidably engaging said head harness and pivotally connected to said shields for adjustably positioning them relatively to the mouth of an animal, and spring means connected to said shields for normally maintaining them in outwardly diverging relationship relatively to each other.

5. A device of the class described comprising side shields, supporting members pivotally mounting said shields, a head harness for supporting and slidably mounting said supporting members whereby they may be adjustably positioned relatively to the head harness for adjustably positioning the shields relatively to the mouth of an animal, and means for yieldably disposing said shields in outwardly diverging relationship relatively to each other.

LOUIS FORREST MOTT.